United States Patent
Hiraike

Patent Number: 6,016,155
Date of Patent: Jan. 18, 2000

[54] CHARACTER PROCESSING APPARATUS, CHARACTER PROCESSING METHOD, AND MEMORY

[75] Inventor: Koou Hiraike, Yokohama, Japan

[73] Assignee: Canon Kabushiki Kaisha, Tokyo, Japan

[21] Appl. No.: 08/638,305

[22] Filed: Apr. 26, 1996

[30] Foreign Application Priority Data

Apr. 28, 1995 [JP] Japan ................................ 7-106198
Apr. 10, 1996 [JP] Japan ................................ 8-088294

[51] Int. Cl.[7] .................................................. G06T 11/20
[52] U.S. Cl. ........................ 345/468; 345/144; 345/472
[58] Field of Search ................................ 345/467, 468, 345/144, 470, 471, 472

[56] References Cited

U.S. PATENT DOCUMENTS

| | | | |
|---|---|---|---|
| 5,468,077 | 11/1995 | Motokado et al. | 400/76 |
| 5,495,560 | 2/1996 | Kumada | 345/467 X |
| 5,526,476 | 6/1996 | Motokado et al. | 345/471 |
| 5,577,177 | 11/1996 | Collins et al. | 345/469 |
| 5,577,184 | 11/1996 | Matoba | 345/472 |

FOREIGN PATENT DOCUMENTS

| | | |
|---|---|---|
| 1-287693 | 11/1989 | Japan . |
| 5-257448 | 10/1993 | Japan . |
| 92-17461 | 9/1992 | Rep. of Korea . |
| 94-8463 | 4/1994 | Rep. of Korea . |
| 94-23242 | 10/1994 | Rep. of Korea . |

*Primary Examiner*—Mark K. Zimmerman
*Attorney, Agent, or Firm*—Fitzpatrick Cella Harper & Scinto

[57] ABSTRACT

It is an object of the invention to reduce an amount of data which is supplied to a character outputting process and to execute the character outputting process at a high speed. On the basis of extra-character registration information, whether bit map data is compressed or not is judged. When the bit map data is not compressed, an extra character is registered into a predetermined area of a storage. When compressing, in accordance with a compression method which is designated by extra-character registration information, the relevant compression method is selected and the bit map data is compressed. Data of the compressed extra character is registered into a predetermined area of the storage. By performing a character output by using optimum font data and scaler every character unit or character set, the data amount can be reduced, the process can be executed at a high speed, and a high-quality output can be performed.

23 Claims, 18 Drawing Sheets

FIG. 16

```
┌──── EXTRA-CHARACTER REGISTRATION INFORMATION ────┐
│                                                    │
│  FONT : MINCHO                                     │
│  MEM : RAM                                         │
│  SCALER SELECTION : DEVELOPMENT                    │
│  CONDITION          SPEED-PREFERENTIAL             │
│                         ┊                          │
│                                                    │
│       ┌──── BIT MAP DATA ────┐                     │
│       │                      │                     │
│       │  100111011100011111000                     │
│       │  001110100001001110001                     │
│       │           ┊                                │
│       │                                            │
│       │                                            │
│       └──────────────────────┘                     │
└────────────────────────────────────────────────────┘
```

CHARACTER PROCESSING APPARATUS, CHARACTER PROCESSING METHOD, AND MEMORY

BACKGROUND OF THE INVENTION

1. Field of the Invention

The invention relates to character processing apparatus, character processing method, and memory for outputting a character pattern.

2. Related Background Art

Since font data developed to a bit map has an extremely large data amount, in order to store the font data in its form, a memory of a large capacity is required and it is not preferable in terms of the costs or the like. Therefore, in general, by performing a compressing process to such font data, the compressed data is held in a printer, thereby reducing a data amount.

It is a general way to variably magnify characters or the like by using a smoothing and variable magnifying method or the like by an outline vector and to develop into a bit map. A program for developing such outline font data is hereinafter called a "scaler".

In the above conventional method, however, since only single compressing means or scaler is provided, it is difficult to efficiently perform processes. That is, as for the font data developed into the bit map, since a scale of data and a decompression speed differ depending on the method of the compressing and decompressing process, it is improper to apply only a single compression method. With respect to the development into the bit map as well, a scale of data, a speed for development into the bit map, a character quality, and the like differ every character in dependence on a scaler to be applied. Therefore, a method of using the same scaler on a character set unit basis is not an optimum method.

SUMMARY OF THE INVENTION

The invention is made in consideration of the above problem and it is an object of the invention to efficiently perform a character outputting process, specifically speaking, to reduce an amount of data which is used for the character outputting process or to execute the character outputting process at a high speed.

To solve the above problems, according to the invention, there is provided a character processing apparatus in which character data is preliminarily registered and, at the time of an outputting process, the character data is referred to, comprising: inputting means for inputting the character data; a plurality of converting means for converting a data form of the inputted character data; selecting means for selectively making any one of the plurality of converting means effective; registering means for registering the character data whose data form was converted; and visible image forming means for developing output target data into a bit map with reference to the registered character data, thereby forming a visible image, wherein an amount of data which is used for the character outputting process can be reduced or the character outputting process can be executed at a high speed.

According to the invention, there is also provided a character processing apparatus in which character data is preliminarily registered and, at the time of an outputting process, the character data is referred to, comprising: inputting means for inputting the character data; a plurality of vector converting means for converting the inputted character data into a vector form; first selecting means for selectively making any one of the plurality of vector converting means effective; a plurality of compressing means for compressing the converted character data; second selecting means for selectively making any one of the plurality of compressing means effective; registering means for registering the compressed character data; decompressing means for decompressing the registered character data; and visible image forming means for decompressing output target data by the decompressing means and developing into a bit map, thereby forming a visible image, wherein an amount of data which is-used for the character outputting process can be reduced or the character outputting process can be executed at a high speed.

According to the invention, there is provided a character processing method in which character data is preliminarily registered and, at the time of an outputting process, the character data is referred to, comprising: an inputting step of inputting the character data; a plurality of converting step of converting a data form of the inputted character data; a selecting step of selectively making any one of the plurality of converting steps effective; a registering step of registering the character data whose data form was converted; and a visible image forming step of developing output target data into a bit map with reference to the registered character data, thereby forming a visible image, wherein an amount of data which is used for the character outputting process can be reduced or the character outputting process can be executed at a high speed.

According to the invention, there is also provided a character processing method in which character data is preliminarily registered and, at the time of an outputting process, the character data is referred to, comprising: an inputting step of inputting the character data; a plurality of vector converting step of converting the inputted character data into a vector form; a first selecting step of selectively making any one of the plurality of vector converting step effective; a plurality of compressing step of compressing the converted character data; a second selecting step of selectively making any one of the plurality of compressing step effective; a registering step of registering the compressed character data; a decompressing step of decompressing the registered character data; and a visible image forming step of decompressing output target data by the decompressing step and developing into a bit map, thereby forming a visible image, wherein an amount of data which is used for the character outputting process can be reduced or the character outputting process can be executed at a high speed.

The above and other objects and features of the present invention will become apparent from the following detailed description and the appended claims with reference to the accompanying drawings.

BRIEF DESCRIPTION OF THE DRAWINGS

FIG. 16 is a diagram conceptually showing an example of extra-character registration information according to the sixth embodiment;

DETAILED DESCRIPTION OF THE PREFERRED EMBODIMENTS

First Embodiment

Figure 1:
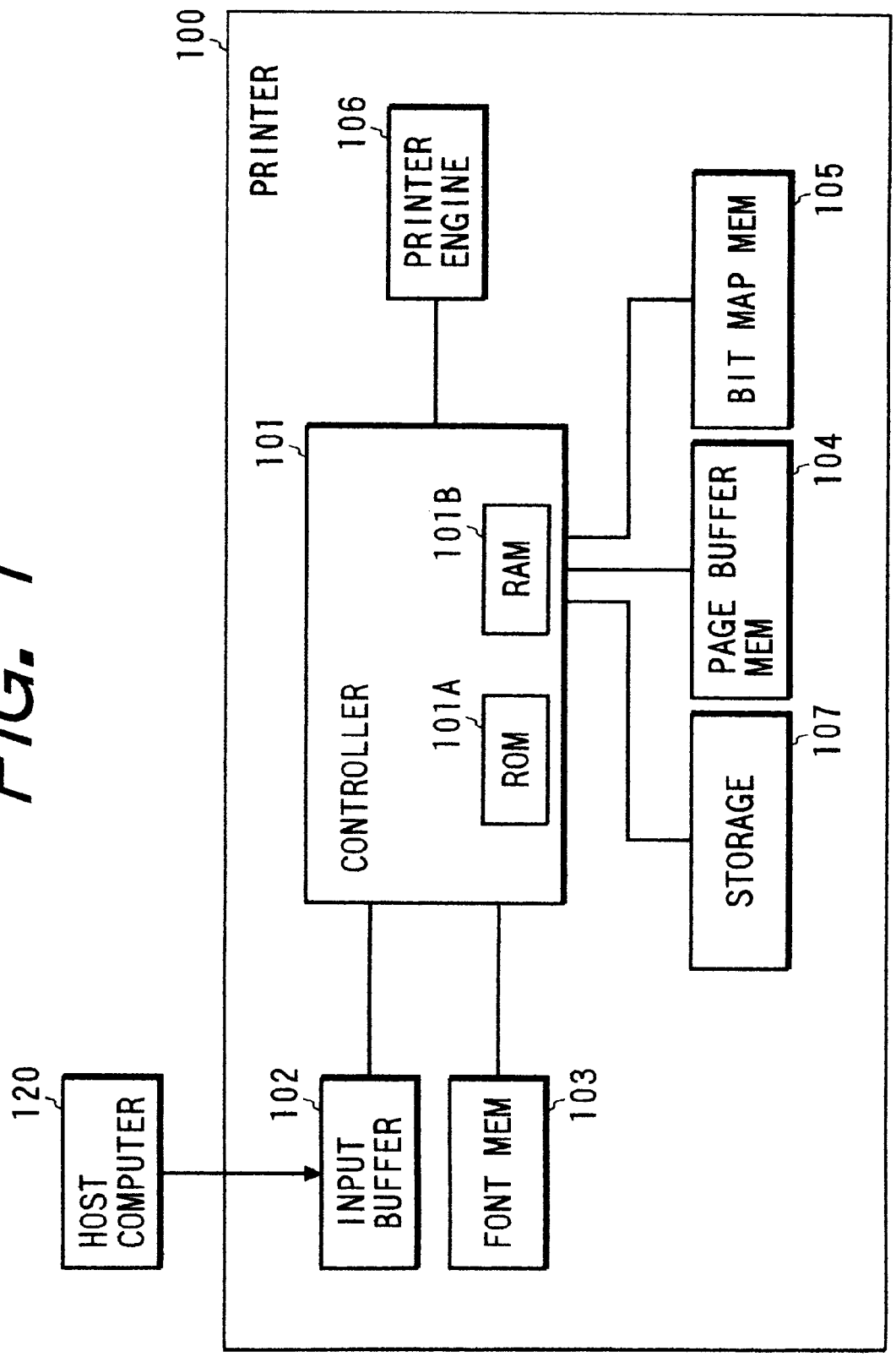
FIG. 1 is a block diagram showing a construction of an apparatus of an electrophotography system according to a typical embodiment of the invention.

The first embodiment according to the invention will now be described hereinbelow with reference to the drawings. FIG. 1 is a block diagram showing a construction of a printer of an electrophotography system according to a typical embodiment of the invention.

A host computer 120 generates print information (data to be printed and outputted) and extra-character registration information (bit map font or information for converting a bit map font into an outline font or the like and for registering an extra character) to a printer 100.

The printer 100 comprises: a controller 101 which is constructed by a CPU and controls the whole printer; an input buffer 102 for temporarily storing print information or the like which is received from the host computer 120; a font memory 103 in which font data has been stored; a page buffer memory 104 to store the received print information or the like on a page unit basis; a bit map memory 105 for developing image data of one page; a printer engine 106 for forming a visible image onto a recording paper on the basis of the image data developed in the bit map memory 105; and a storage 107 constructed by an RAM, an ROM, a hard disk, or the like to store extra characters.

The controller 101 has an ROM 101A in which programs to control the whole printer 100 and the like have been stored and a work memory 101B.

Figure 2:
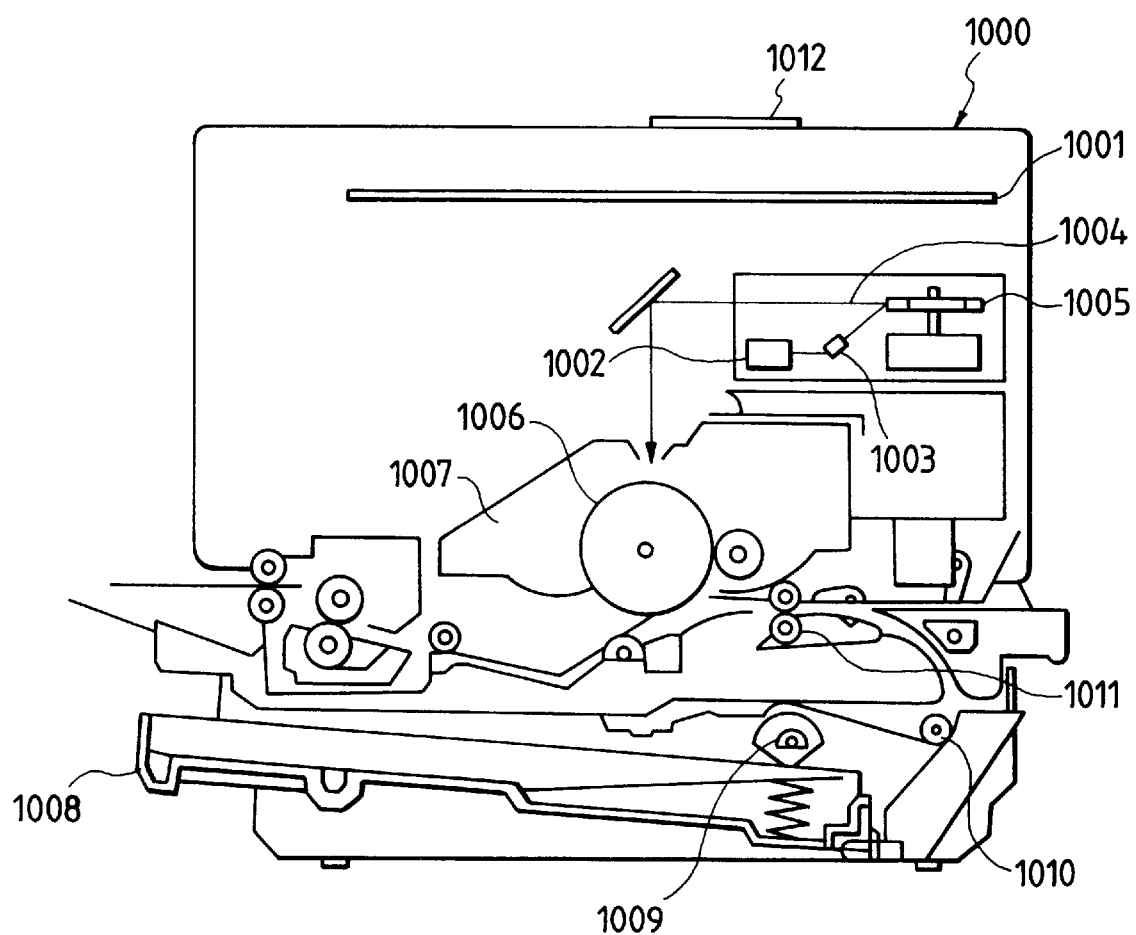
FIG. 2 is a cross sectional view showing an internal structure of a laser beam printer as an example of a printer 100.

FIG. 2 is a cross sectional view showing an internal structure of a laser beam printer as an example of the printer 100. The laser beam printer (hereinafter, referred to as an "LBP") can register a character pattern from a data source (not shown) and can register a regular format (form data) or the like.

Reference numeral 1000 denotes an LBP main body for inputting and storing character information (character codes) and form information which are supplied from the host computer 120 connected to the outside, a macro command, and the like, forming a corresponding character pattern, form pattern, or the like in accordance with those information, and forming an image onto a recording paper as a recording medium.

Reference numeral 1012 denotes an operation panel on which switches for operation, an LED display, and the like are arranged; and 1001 indicates a printer control unit for controlling the whole LBP 1000 and analyzing the character information and the like which are supplied from the host computer. The control unit 1001 mainly converts the character information into a video signal of the corresponding character pattern and outputting to a laser driver 1002. The laser driver 1002 is a circuit for driving a semiconductor laser 1003 and switches on/off operations of a laser beam 1004 that is emitted from the semiconductor laser 1003 in accordance with the inputted video signal.

The laser beam 1004 is moved to the right and left by a rotary polygon mirror 1005 and scans on an electrostatic drum 1006. Thus, an electrostatic latent image of the character pattern is formed on the drum 1006. The latent image is developed by a developing unit 1007 around the drum 1006 and, after that, the developed image is transferred to the recording paper. A cut sheet is used as a recording paper. The cut sheet recording papers are enclosed in a sheet cassette 1008 attached to the LBP 1000, are picked up and conveyed one by one into the printer by a feed roller 1009 and conveying rollers 1010 and 1011, and are supplied to the electrostatic drum 1006.

Figure 3:
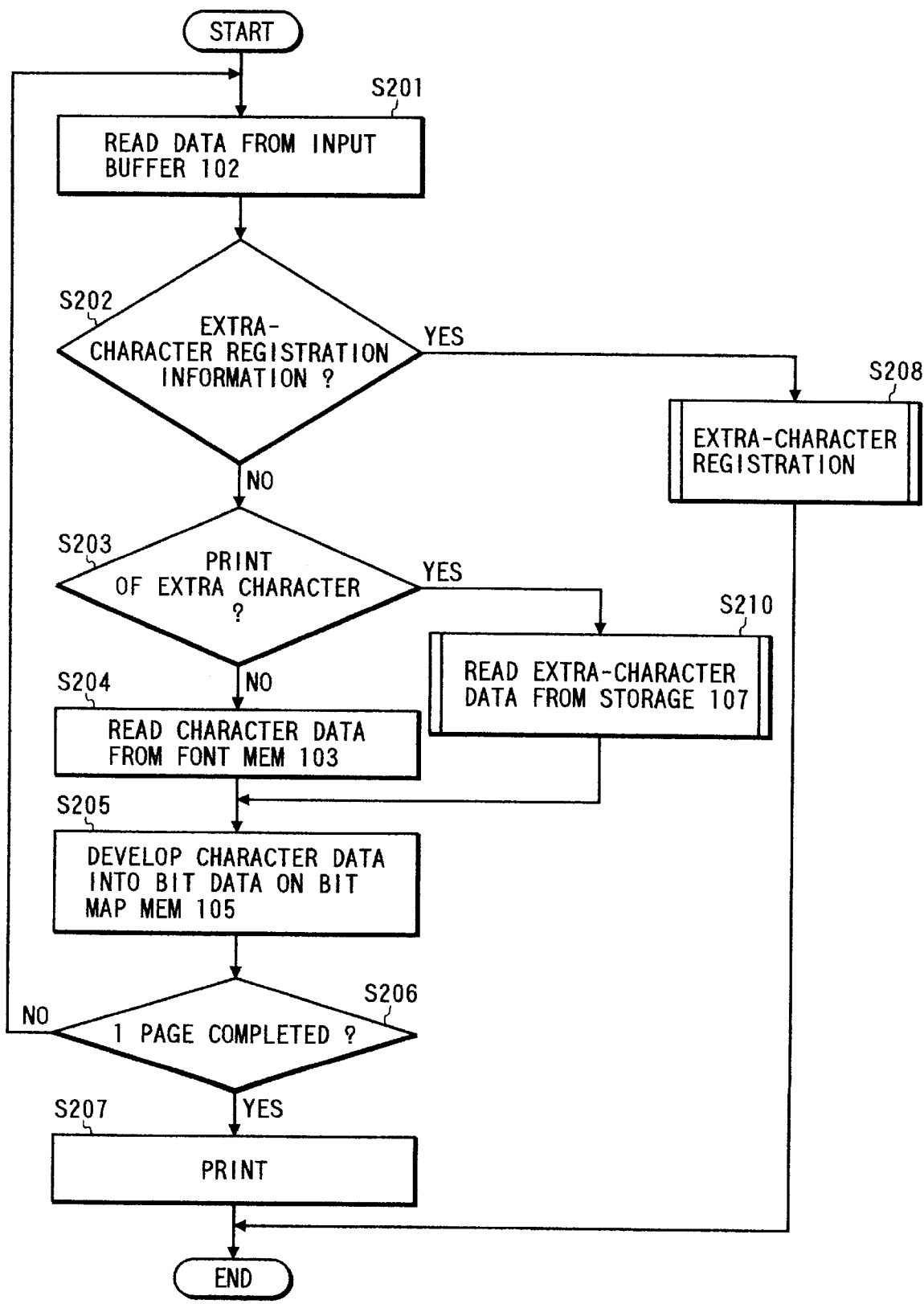
FIG. 3 is a flowchart showing a flow for a printing process in the printer 100.

FIG. 3 is a flowchart showing a flow for a printing process in the printer 100. The printing process is controlled by the controller 101 on the basis of the control programs stored in the ROM 101A. In the embodiment, when print information or extra-character registration information is received from the host computer 120, the received data is stored into the input buffer 102 by generating a reception interruption to the controller 101. Therefore, a receiving process is executed in parallel with a series of processes shown in the flowchart.

First in step S201, the received data is read by the input buffer 102. In step S202, a check is made to see if the read data is the print information or extra-character registration information. In the specification, "extra character" denotes a character whose font is not stored in the font memory 103 and "extra-character registration information" denotes information to register the extra character into the printer 100. The extra-character registration information will be described in detail hereinlater.

When the read data is the extra-character registration information, a process to register the relevant extra character is executed in step S208. This process will be explained in detail hereinlater. When the read data is the print information, in step S203, a check is made to see if the print information is information to request the printing of the extra character. When it is not the information to request the printing of the extra character, step S204 follows. The relevant character data is read out from the font memory 103. In step S205, an image based on the character data is developed into the bit map memory 105.

In case of printing the extra character, the character data which has been registered as an extra character in step S208 is read out from the storage 107 in step S210. In step S205, the image is developed into the bit map memory 105 on the basis of the character data. The details of the process for reading the extra-character data will be described hereinlater.

In step S206, a check is made to see if the bit map development of one page has been finished. If NO, the processing routine is returned to step S201. The above processes are repetitively executed. When the bit map development of one page is finished, step S207 follows and the image of one page is formed onto the recording paper by the printer engine 106.

Figure 4:
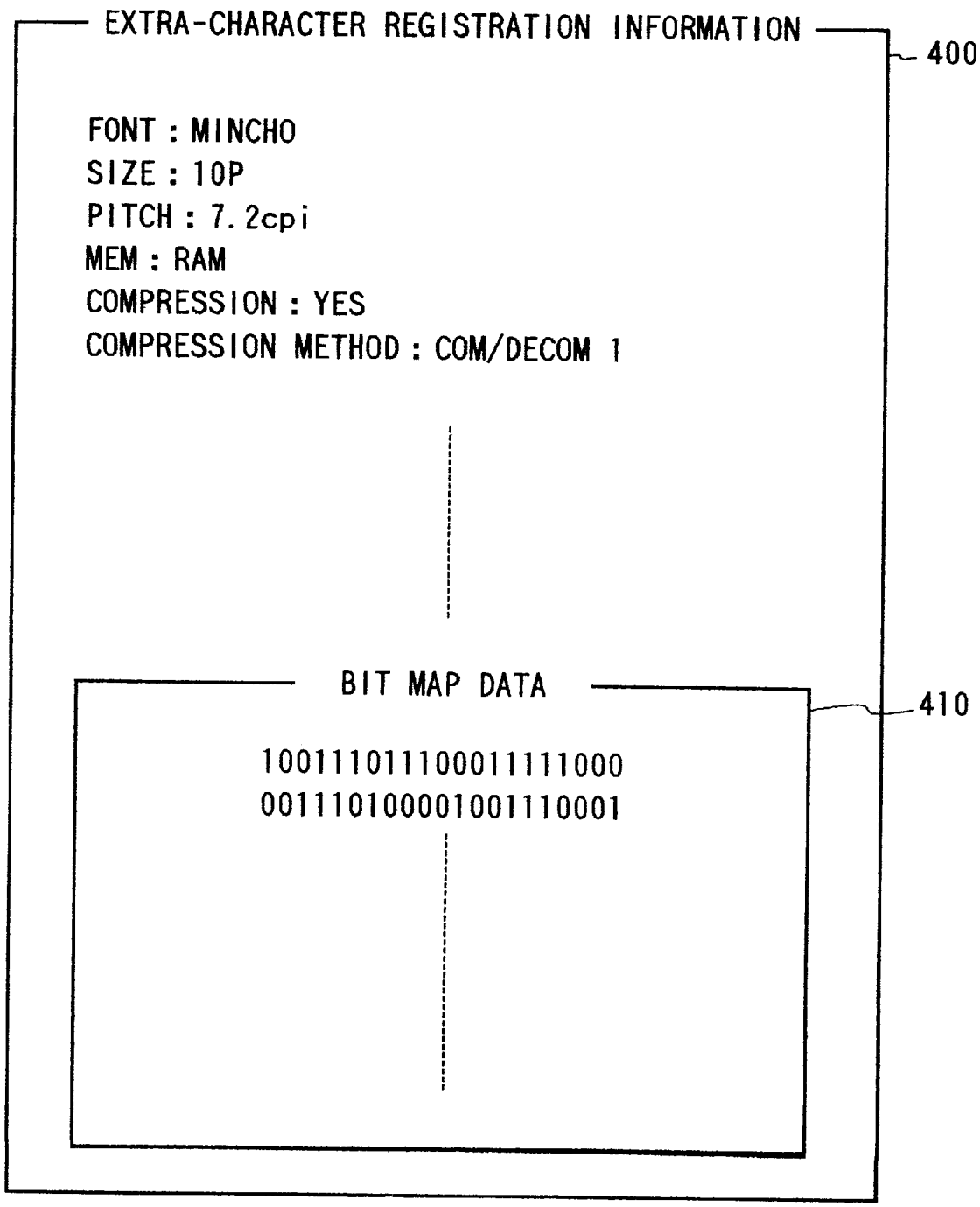
FIG. 4 is a diagram conceptually showing extra-character registration information in the first embodiment.

FIG. 4 is a diagram conceptually showing the extra-character registration information in the embodiment. The extra-character registration information is actually described by a page description language or the like as a control code of the printer. Information such as identifier of a memory, the presence or absence of the compression, compression method, and the like which are necessary for the extra-character registration in addition to character attributes such as font name, character size, character pitch, and the like is included in the extra-character registration information.

Figure 5:
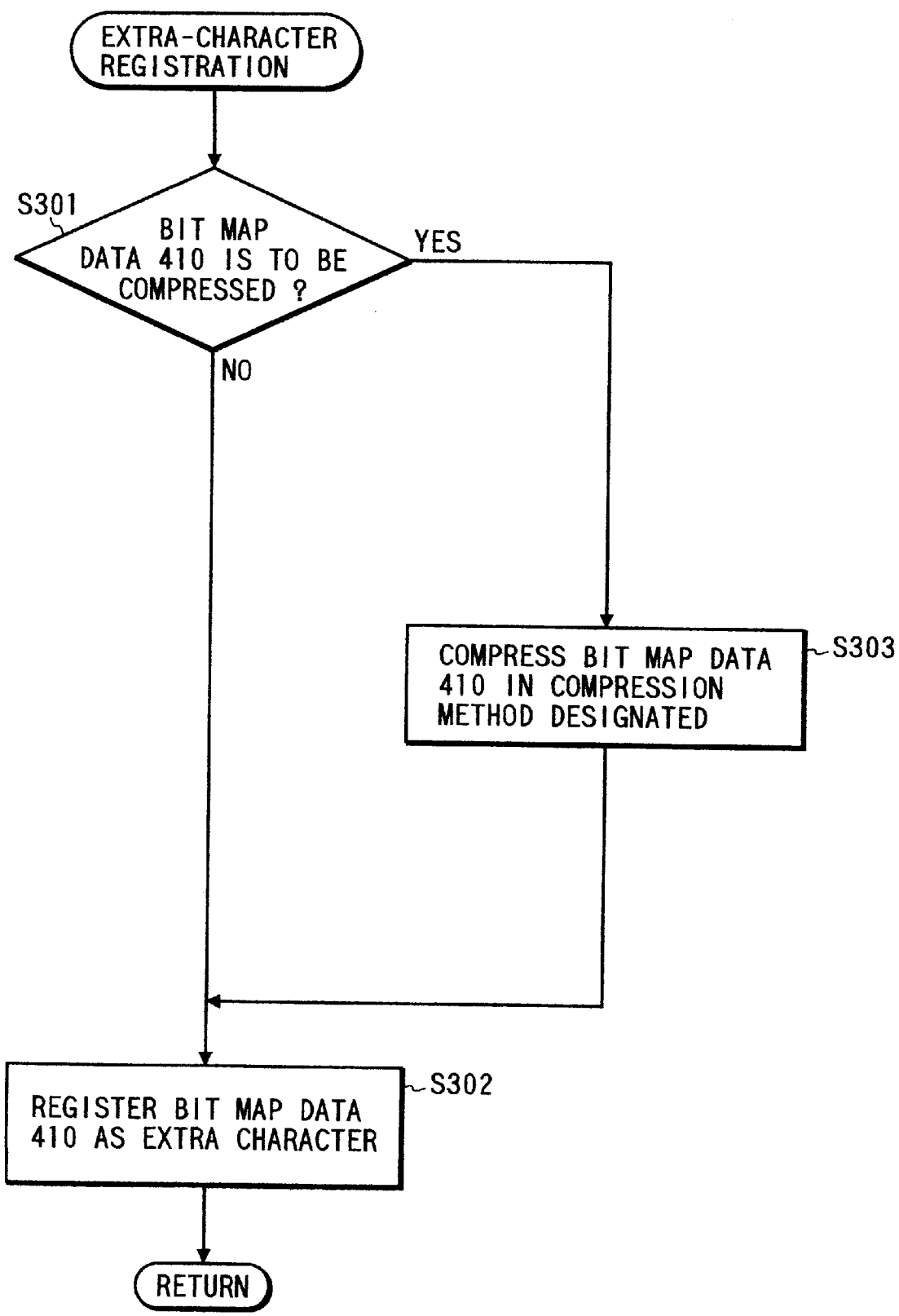
FIG. 5 is a flowchart showing a flow for an extra-character registering process according to the first embodiment.

FIG. 5 is a flowchart showing a flow for the extra-character registering process (step S208). This process is controlled by the controller 101 on the basis of the control programs stored in the ROM 101A. First in step S301, a check is made to see if bit map data 410 is compressed or not on the basis of extra-character registration information 400. If NO, step S302 directly follows and the extra character is registered into a predetermined area in the storage 107. If YES, step S303 follows and in accordance with a compression method (compression/decompression method 1 in case of the example of FIG. 4) which is designated by the extra-character registration information 400, the relevant compression method is selected and the bit map data 410 is compressed. The data of the extra character which was compressed is registered into a predetermined area in the storage 107 in step S302.

Figure 6:
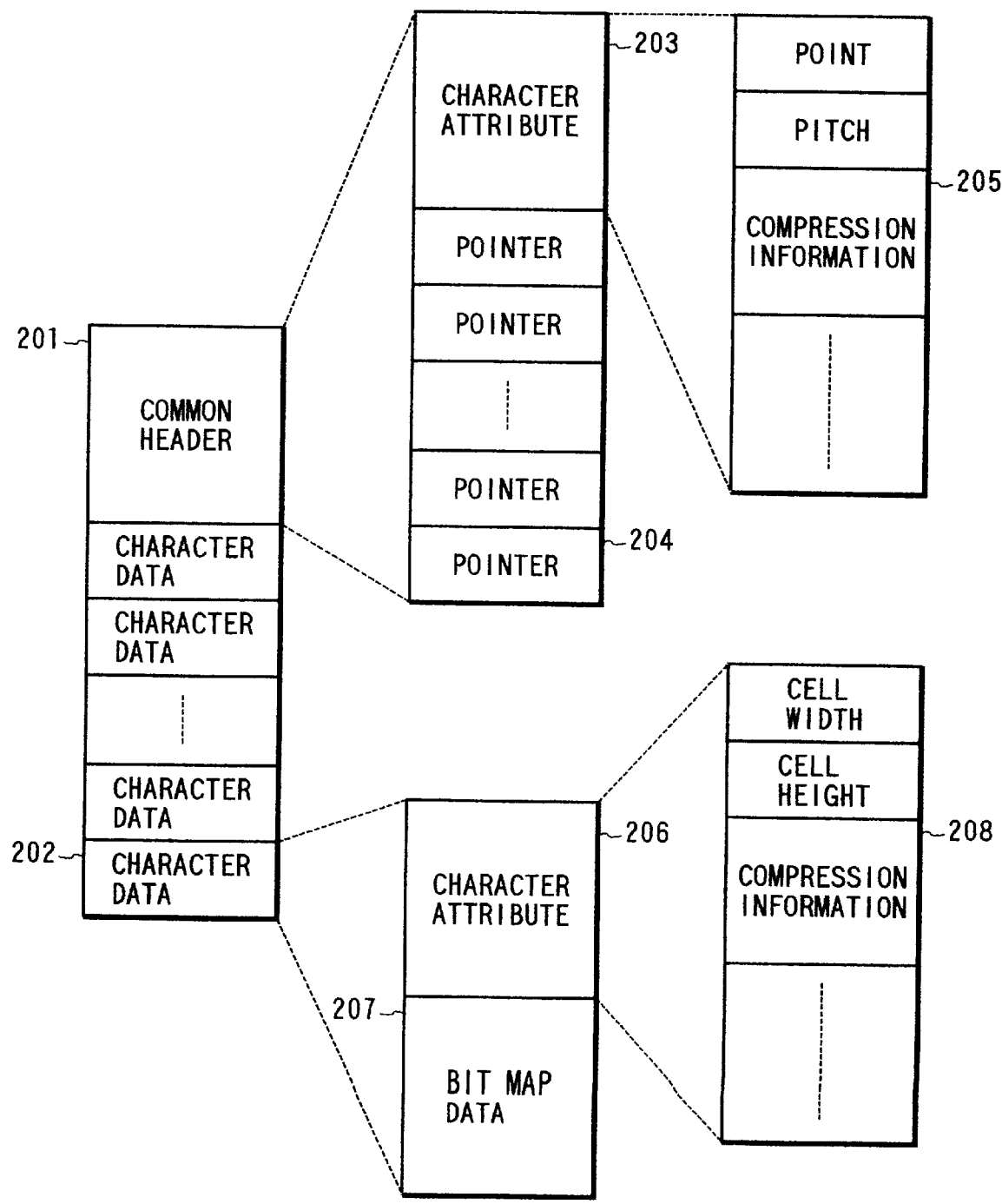
FIG. 6 is a diagram showing an example of a data structure when an extra character is registered into a storage 107.

FIG. 6 is a diagram showing an example of a data structure when registering an extra character into the storage 107. Reference numeral 201 denotes a header which is common to all characters to be registered into the storage 107. Character data (for example, 202) is character information of each character. The header 201 includes a character attribute 203, a pointer (for example, 204) of each character data, compression information 205 to identify the presence or absence of the compression and the kind of compression and the like. The character data (for example, 202) includes a character attribute 206, bit map data 207, compression information 208 to identify the presence or absence of the compression and the kind of compression, and the like.

In case of compressing on a group unit basis such as graphic set unit, character set unit, font unit, or the like, information to identify the presence or absence of the compression and the compression method is added to the compression information 205. In case of compressing on a character unit basis, information (for example, an ID, a flag, or the like) to identify the presence or absence of the compression and the compression method is added to the compression information 208.

Figure 7:
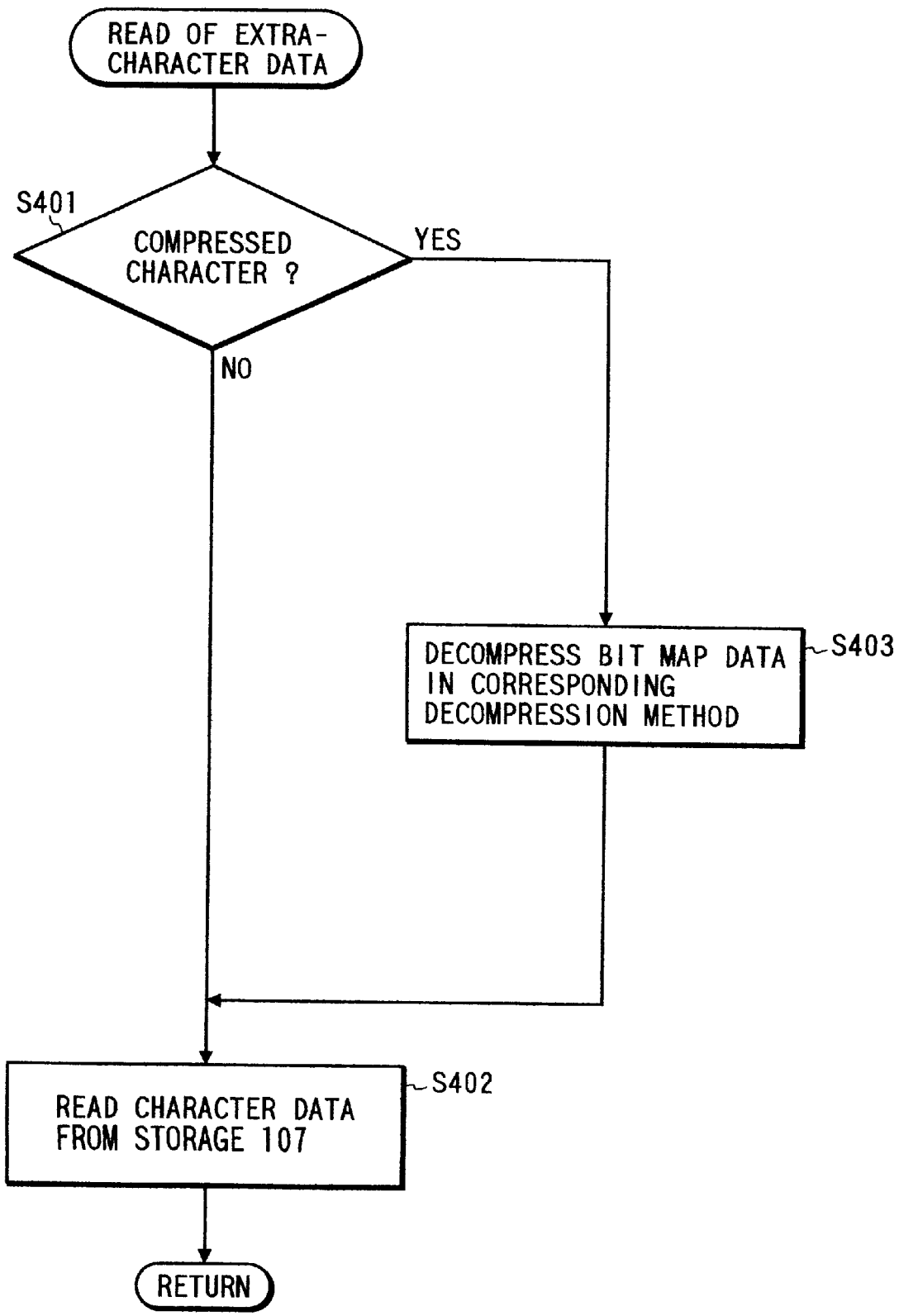
FIG. 7 is a flowchart showing a flow for an extra-character data reading process.

The process (step S210) for reading the data which was registered as an extra character will now be described. This process is controlled by the controller 101 on the basis of the control programs stored in the ROM 101A. FIG. 7 is a flowchart showing a flow for the extra-character data reading process. First in step S401, a check is made to see if the relevant character is a compressed character or not with reference to the compression information 205 or 208 (FIG. 6). If NO, step S402 follows and a character code of the relevant extra-character code is read out from the storage 107. In case of the compressed character, step S403 follows. The relevant decompression method is selected with reference to the compression information 205 or 208 and the bit map data is decompressed. The decompressed bit map data is successively stored into the work memory 101B (read). In step S401, the presence or absence of the compression is first discriminated on the basis of the compression information 205, and when the compression is performed, the presence or absence of the compression and the kind of compression are discriminated on the basis of the compression information 208, so that a processing speed can be raised.

After completion of the reading of the data registered as an extra character, the bit map development is executed in step S207 as mentioned above.

The programs for compression and decompression are not limited to the programs which have previously been stored in (ROM 101A) the printer 100 but can be also added from the outside (for example, host computer 120). Those programs can be also deleted from the ROM 101A.

By constructing as mentioned above, since the compression method can be selected on a unit basis of an arbitrary unit such as character unit, group unit, or the like, the compression method adapted to each unit can be selected (including the presence or absence of the compression). As a whole, the improvement of the decompressing speed and the reduction of a data scale can be realized.

Second Embodiment

Although the first embodiment has been described with respect to the case of designating the compression method by the extra-character registration information, the second embodiment will now be described with respect to the case of automatically selecting the compression method in the printer 100.

Figure 8:
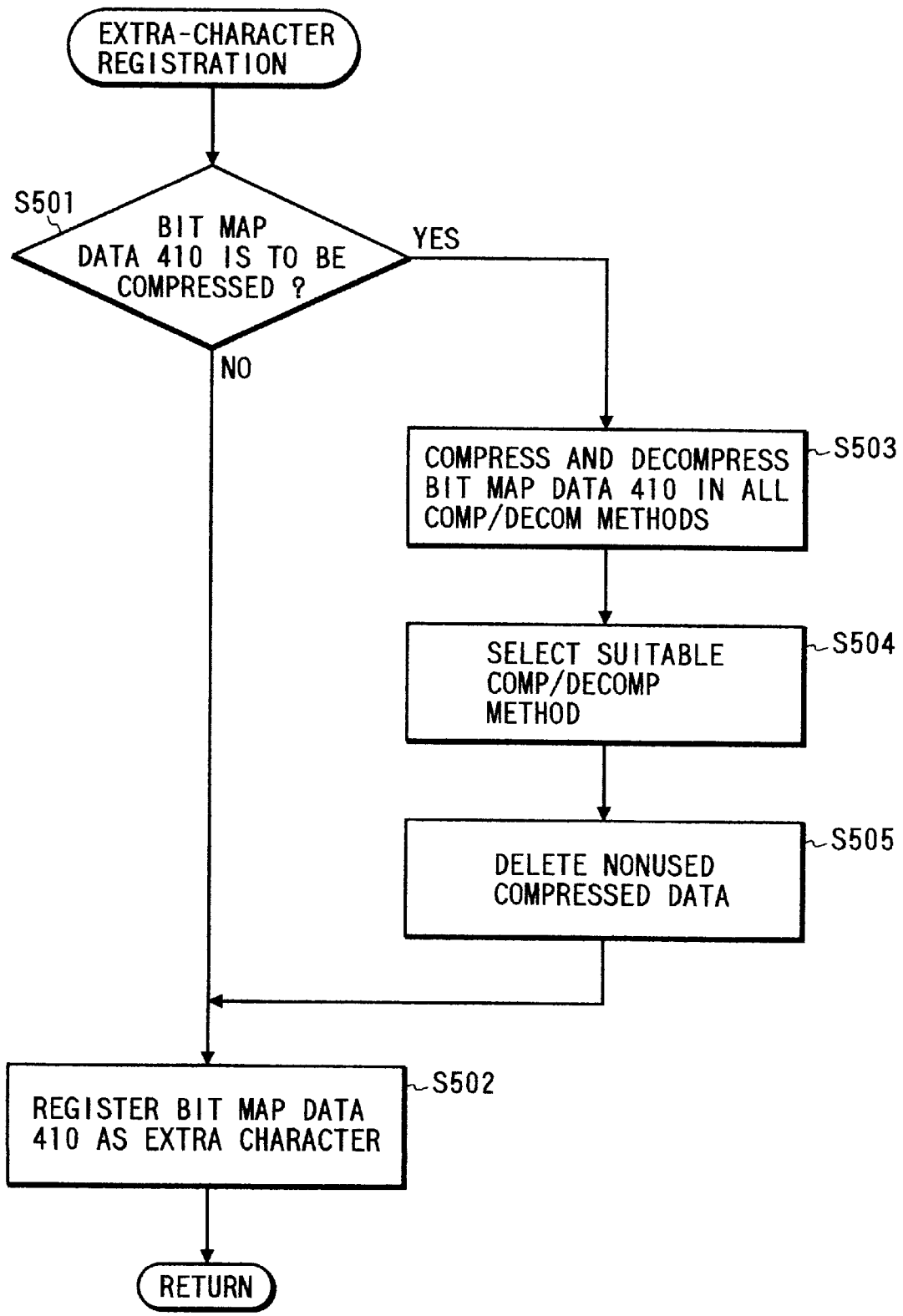
FIG. 8 is a flowchart showing a flow for an extra-character registering process according to the second embodiment.

In the printing process according to the embodiment, the extra-character registering process in the first embodiment is changed as follows. FIG. 8 is a flowchart showing a flow for the extra-character registering process according to the embodiment. This process is controlled by the controller 101 on the basis of the control programs stored in the ROM 101A. First in step S501, a check is made to see if the bit map data 410 is compressed or not in accordance with the extra-character registration information 400. If NO, no process is executed but the bit map data 410 is registered as it is in step S502. In case of compressing, step S503 follows.

Figure 9:
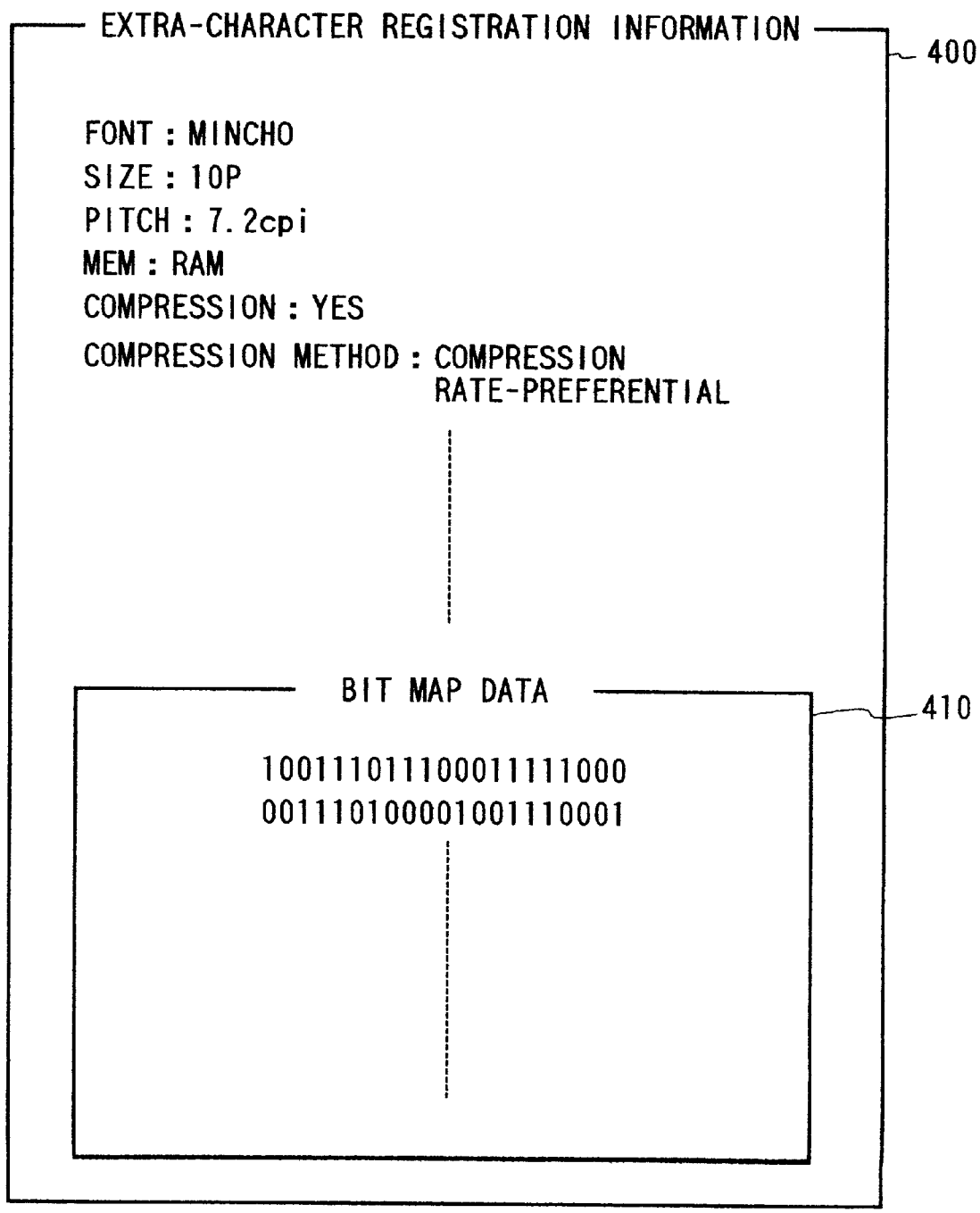
FIG. 9 is a diagram showing an example in case of designating selection conditions of a compression method by the extra-character registration information.

In step S503, the relevant bit map data 410 is subjected to the compressing and decompressing process by using all of the compression and decompression methods (all of the compression and decompression programs stored in the ROM 101A) and information such as processing time, compression rate, and the like is held. In step S504, on the basis of the information held, the compression and decompression method adapted to the preset selection conditions (compression-rate preferential, decompression speed preferential, etc.) are selected. The selection conditions can be also independently set in the printer or can be also designated by the extra-character registration information 400. FIG. 9 is a diagram showing an example in case of designating the selection conditions of the compression method by the extra-character registration information.

As mentioned above, by executing the compression and decompression with regard to all of the compression and decompression methods, although it takes a long time for the registration of extra character, after completion of the registration once, the decompressing process can be executed at a high speed. In case of selecting the compression and decompression method by preferentially using the compression rate, a scale of data can be obviously reduced.

Further, the selection conditions can be also set in a manner such that the decompression speed is preferentially used as for a character whose use frequency is high and that the compression rate is preferentially used with respect to a character whose use frequency is relatively low. The selection conditions can be also shifted step by step in a manner such that the decompression speed is preferentially used in the case where a vacant capacity of the storage 107 is sufficiently large and that the compression rate is preferentially used in the case where there is not so an enough surplus vacant capacity.

In step S505, the data other than the compression data regarding the selected compression and decompression method is deleted from the work memory 101B (in the case where the compression data has been saved in the storage 107, the relevant compression data in the storage 107 is deleted).

The processes in steps S503 to S505 can be also changed as follows. That is, the bit map font is compressed and decompressed by applying the first compression and decompression method and the processing time, compression rate, and compression data are held. The next compression and decompression method is applied and the processing time and compression rate are compared with those in the foregoing compression method. Only the processing time, compression rate, and compression data according to the compression and decompression methods which is more adapted to the selection conditions are held. By similarly applying the third and subsequent compression and decompression methods, the compression data according to the compression and decompression method which is most adapted to the selection conditions can be obtained. In this case, it is sufficient to keep an area to hold the compression data by up to two compression and decompression methods.

By executing the processes as mentioned above, the compression method can be automatically selected. On the other hand, in association with it, the optimum compressing process according to each application such as compression rate preferential, decompression speed preferential, or the like can be performed.

As described above, in case of judging whether the compression is performed on a unit basis of an arbitrary group unit such as character unit, graphic set unit, character set unit, font unit, or the like or executing the different compression method to the bit map data, by performing the compression and storing into the memory with regard to a character such as Kanji or the like whose use frequency is relatively low, the data capacity can be reduced.

With respect to a character such as a non-Kanji (Hiragana, Katakana, numeral, alphabet, etc.) whose use frequency is high, by storing the data without compressing, the decompressing process is unnecessary. Thus, a reduction in printing speed can be prevented.

Further, the compression method can be also selectively used in a manner such that in case of most preferentially reducing the data amount, with regard to the character whose use frequency is high, a compression in which the decompressing speed is preferentially used than the compression rate is performed and that with respect to the character whose use frequency is low, a compression in which the compression rate is preferentially used than the decompressing speed is performed.

The data capacity can be reduced and the decrease in printing speed can be prevented by a method whereby the compression is not performed with respect to the font such as Mincho, Gothic, or the like whose use frequency is high and the data is compressed with regard to the font such as Mohitsu style or the like whose use frequency is low.

Third Embodiment

According to the embodiment, in case of deleting a part of a plurality of programs for compression and decompression stored in the ROM 101A (in case of receiving a deleting command from the host computer 120 or the like), a situation in which the character data compressed by the compression and decompression programs to be deleted enters a use unable state is avoided.

Figure 10:
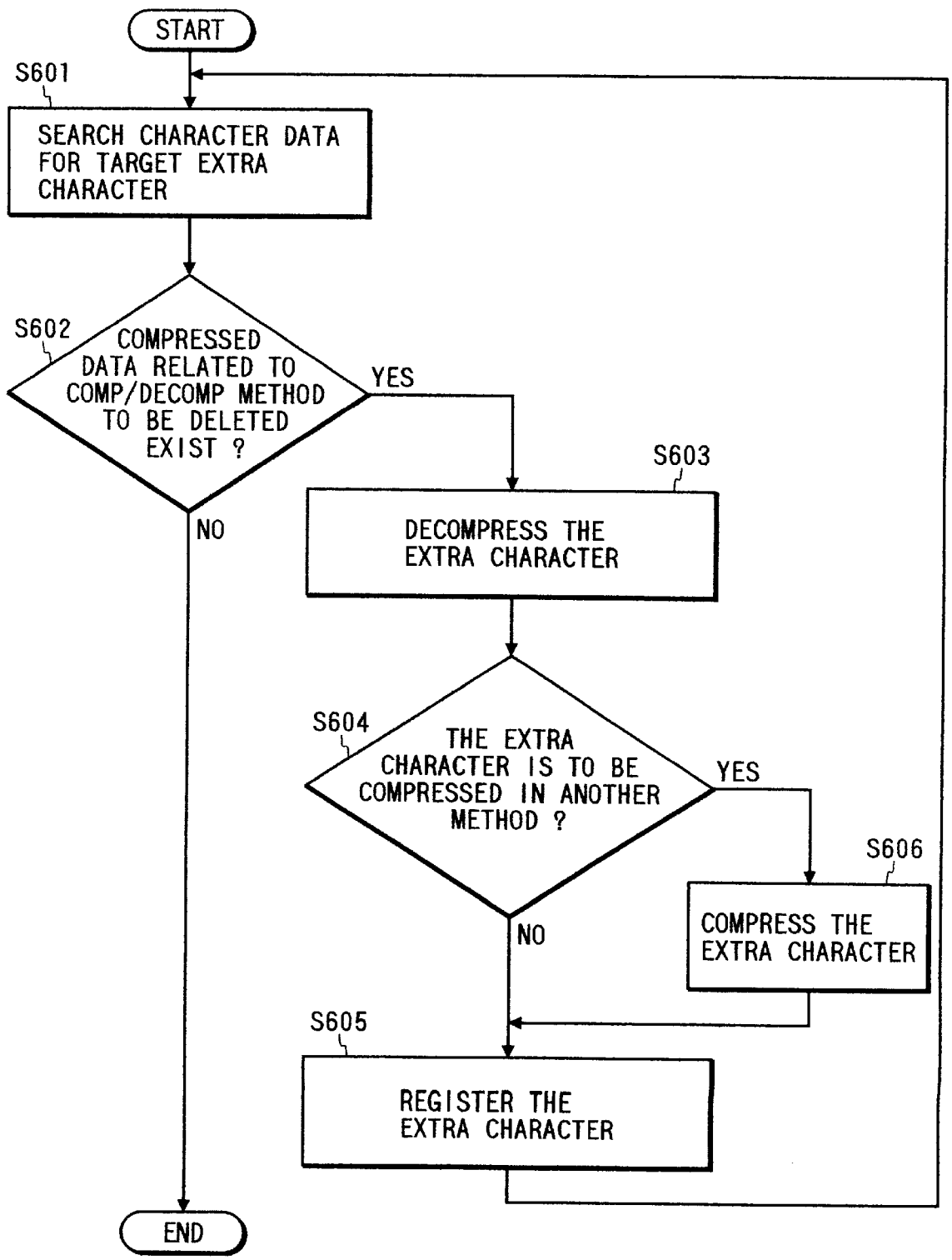
FIG. 10 is a flowchart showing a flow for the operation of the printer 100 according to the third embodiment.

FIG. 10 is a flowchart showing a flow for the operation of the printer 100 according to the embodiment. This process is controlled by the controller 101 on the basis of the control programs stored in the ROM 101A. A shift from the process according to the flowchart of FIG. 3 to the process according to the embodiment can be realized by generating an interruption to the controller 101 when a deleting command is received (such a shift can be also performed by another method).

When the compression and decompression programs are deleted from the ROM 101A, first in step S601, the character data which was compressed and registered by using the compression and decompression programs as targets to be deleted are searched. When the relevant extra character is found or when the search of all of the extra characters is finished, step S602 follows. It is sufficient to perform such a search with reference to the compression information 205 or 208.

In step S602, a check is made to see if compression data regarding the compression and decompression programs to be deleted exists or not as a result of the search. When the compression data doesn't exist, the processing routine is finished. When the compression data exists, step S603 follows and the relevant extra character is decompressed. In step S604, a check is made to see if the decompressed character data is again compressed by using another compression method (compression and decompression methods which are not deleted) or not. It is sufficient to perform such a judgment in accordance with the first or second embodiment. As a result of the judgment, the character data compressed in step S606 or the character data which is not compressed is registered in step S605. After that, the processing routine is returned to step S601 and the series of processes are repetitively executed. In step S602, when it is judged that there is no extra-character according to the compression and decompression method as a target to be deleted, the series of processes are finished.

By deleting the compression and decompression method (program) from the ROM 101A by performing the processes as mentioned above, it is possible to prevent that the character data compressed by the compression and decompression method enters a use unable state.

Fourth Embodiment

According to the embodiment, a different scaler is used for an outline font on a group unit basis such as character unit, graphic set unit, character set unit, font unit, or the like and information to identify the scaler that is used is added to each outline font, thereby effectively using a plurality of scalers.

Figure 11:
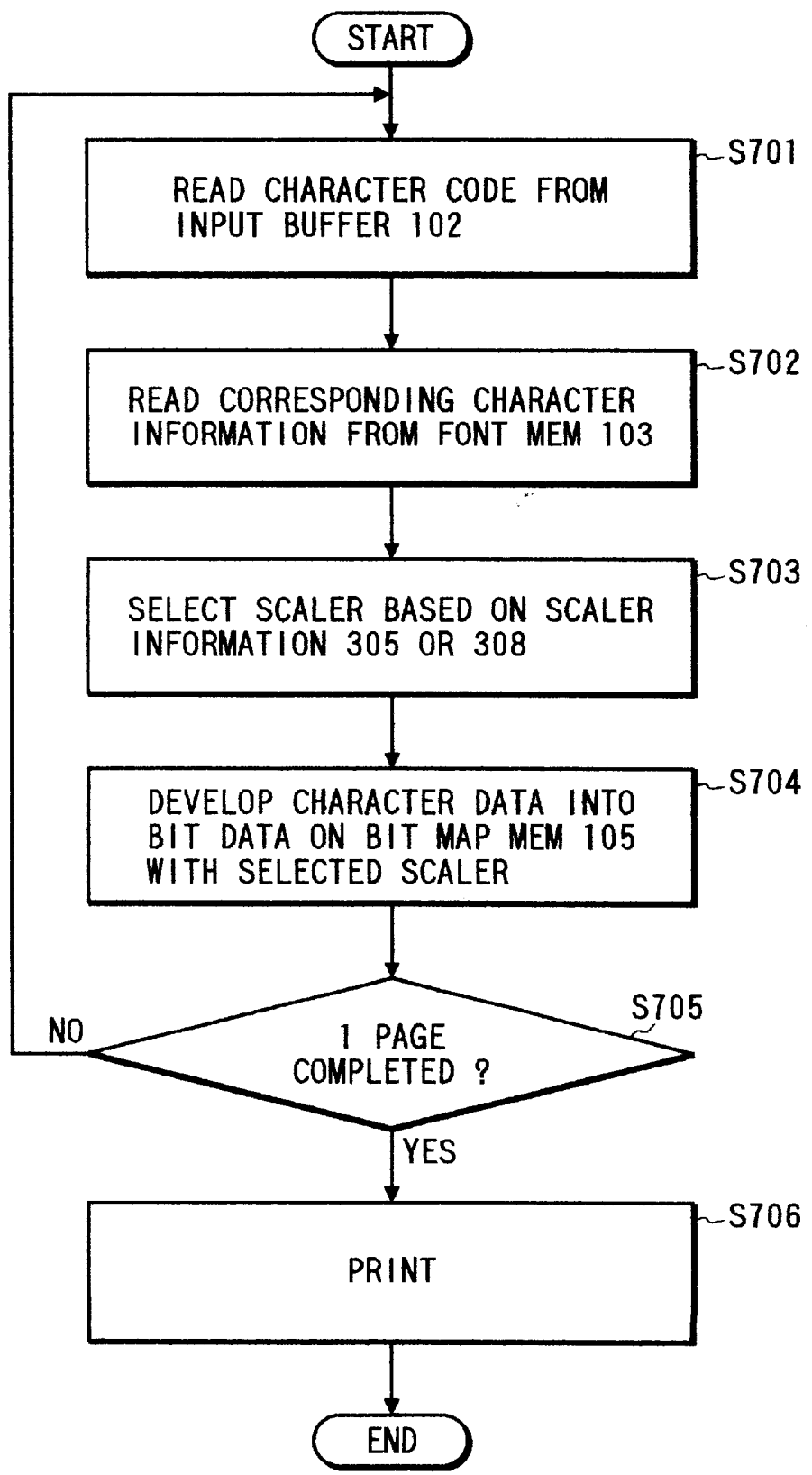
FIG. 11 is a flowchart showing a flow for the operation of the printer 100 according to the fourth embodiment.
Figure 12:
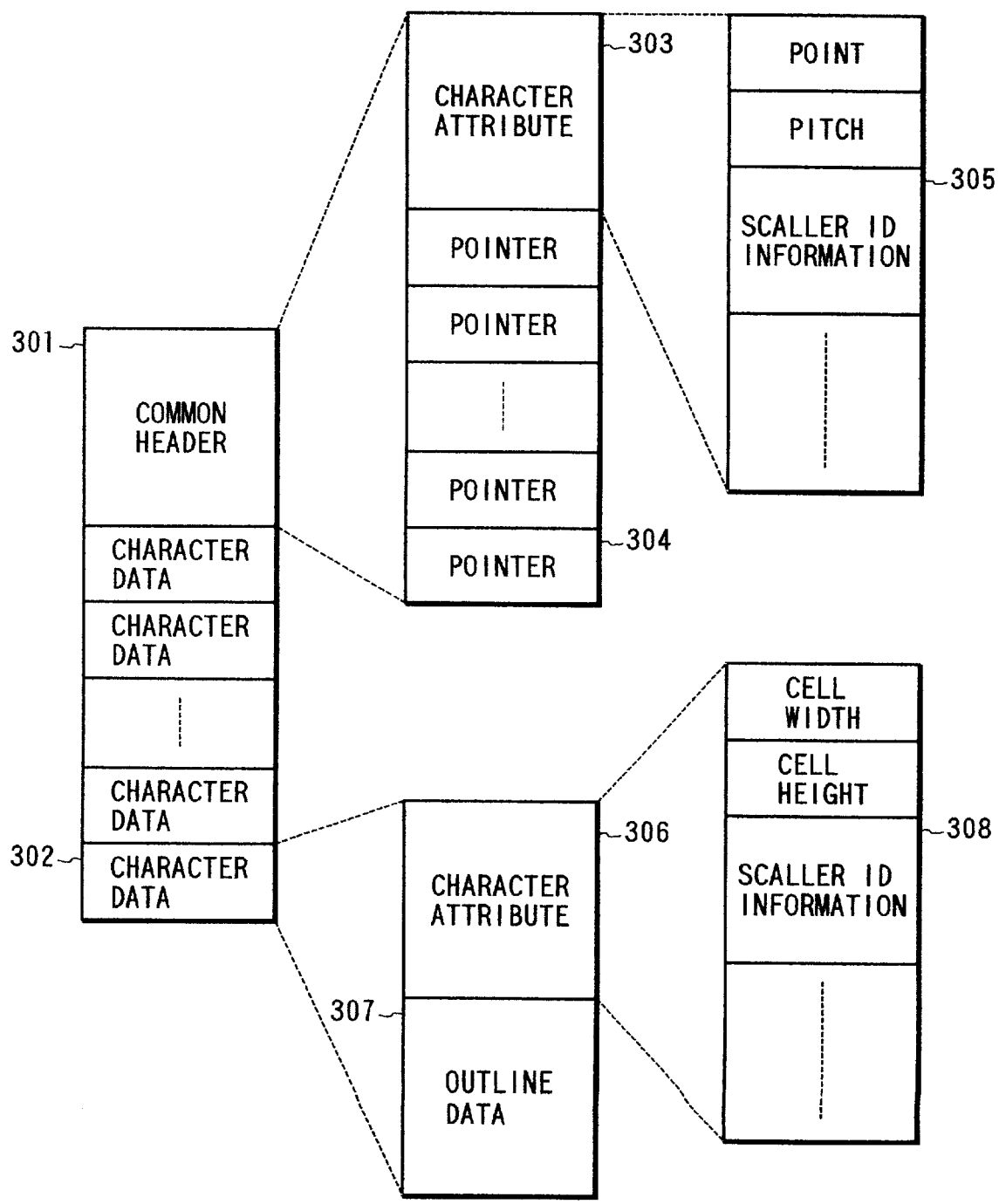
FIG. 12 is a diagram showing an example of a structure of character information in a font memory 103.

FIG. 11 is a flowchart showing a flow for the operation of the printer 100 according to the embodiment. This process is controlled by the controller 101 on the basis of the control programs stored in the ROM 101A. First in step S701, the character code is read out from the input buffer 102. In step S702, the character information corresponding to the character code is read out from the font memory 103. FIG. 12 is a diagram showing an example of a structure of the character information in the font memory 103. Reference numeral 301 denotes a header which is common to all characters. Character data (for example, 302) is character information of each character. The header 301 includes a character attribute 303, a pointer 304, scaler ID information 305 to identify a scaler, and the like. The character data (for example, 302) includes a character attribute 306, outline data 307, scaler ID information 308 to identify a scaler, and the like.

In case of using the same scaler on a group unit basis such as graphic set unit, character set unit, font unit, or the like, in the case where the scaler differs on a character unit basis for the scaler ID information 305, information (for example, an ID, flag, or the like) such that the scaler which is used for the scaler ID information 308 can be judged is added.

In step S703, the scaler is selected on the basis of the scaler information 305 or 308. In step S704, the outline data corresponding to the character code is bit map developed into the bit map memory 105 by using the selected scaler. In step S705, when it is judged that the bit map developing process of one page has been finished, step S706 follows and an image of one page is formed on the recording paper by the printer engine 106. When the bit map development of one page is not finished, the processing routine is returned to step S701. The series of processes are repeated.

The program to realize the function of the scaler is not limited to the programs which have previously been stored in the printer 100 (ROM 101A) but can be also added from the outside (for example, host computer 120). Such a program can be also deleted from the ROM 101A.

By constructing as mentioned above, since the scaler can be selected on an arbitrary unit basis such as character unit, group unit, or the like, the process adapted to each unit can be executed. As a whole, the improvement of a processing speed of the bit map development and the reduction in data scale can be accomplished.

The scaler which is used in the embodiment will now be described.

Figure 18A:
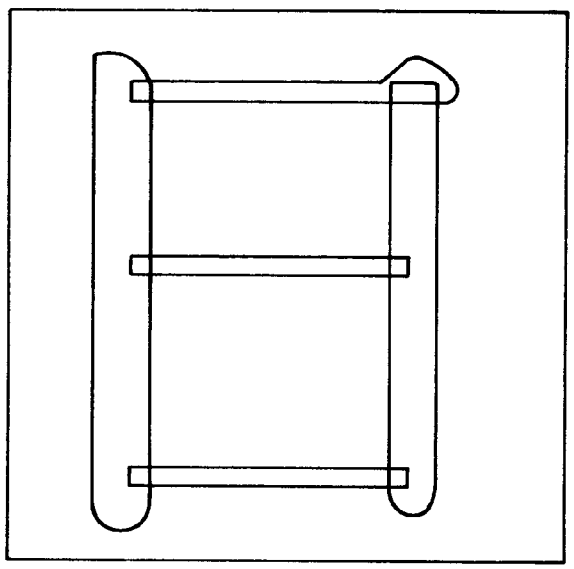
FIGS. 18A and 18B are diagrams for explaining font data.

In case of using the different scaler to the outline font on an arbitrary group unit basis such as character unit, graphic set unit, character set unit, font unit, or the like, with respect to the character such as a Kanji or the like whose use frequency is relatively low, each part is commonly used although a developing speed deteriorates. Therefore, by using the scaler such that it is sufficient to use a small outline data capacity (outline font data of a stroke format shown in FIG. 18A and a scaler to develop the font data), the data capacity can be reduced.

Figure 18B:
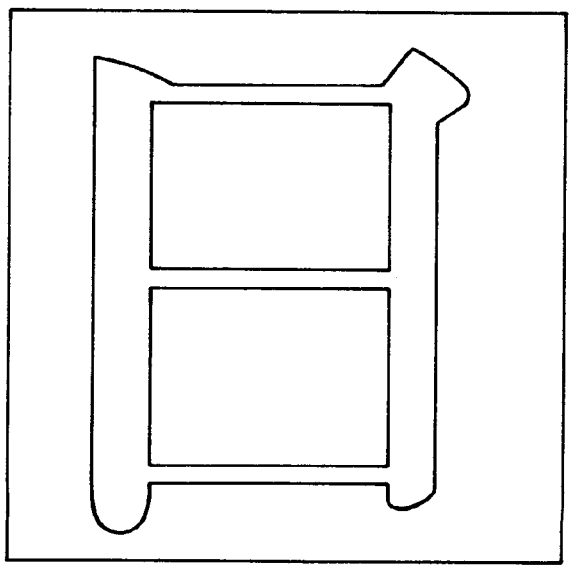

On the other hand, with respect to the character such as a non-Kanji (Hiragana, Katakana, numeral, alphabet, etc.) whose use frequency is high, although the memory capacity increases, by using the scaler of a high bit map development processing speed [outline font data (design space is designed by 200×200) of a whole outline type shown in FIG. 18B and a scaler to develop the font data], the scaler which intends to realize a high-speed print rather than the data reduction can be selectively used.

As for the font such as a Mohitsu style in which significance is paid to a character design (for example, Gyosho style), by using the scaler which is excellent in the character quality rather than the data reduction, high-speed printing, and memory capacity reduction [outline font data (design space is designed by 800×800) of the whole outline type shown in FIG. 18B and its scaler], the character quality can be improved.

Fifth Embodiment

According to the embodiment, an arbitrary scaler is selected and a bit map font of an extra character is converted into an outline font and is registered into the storage 107. The extra-character registering process (step S208) in the first embodiment is changed as follows.

Figure 13:
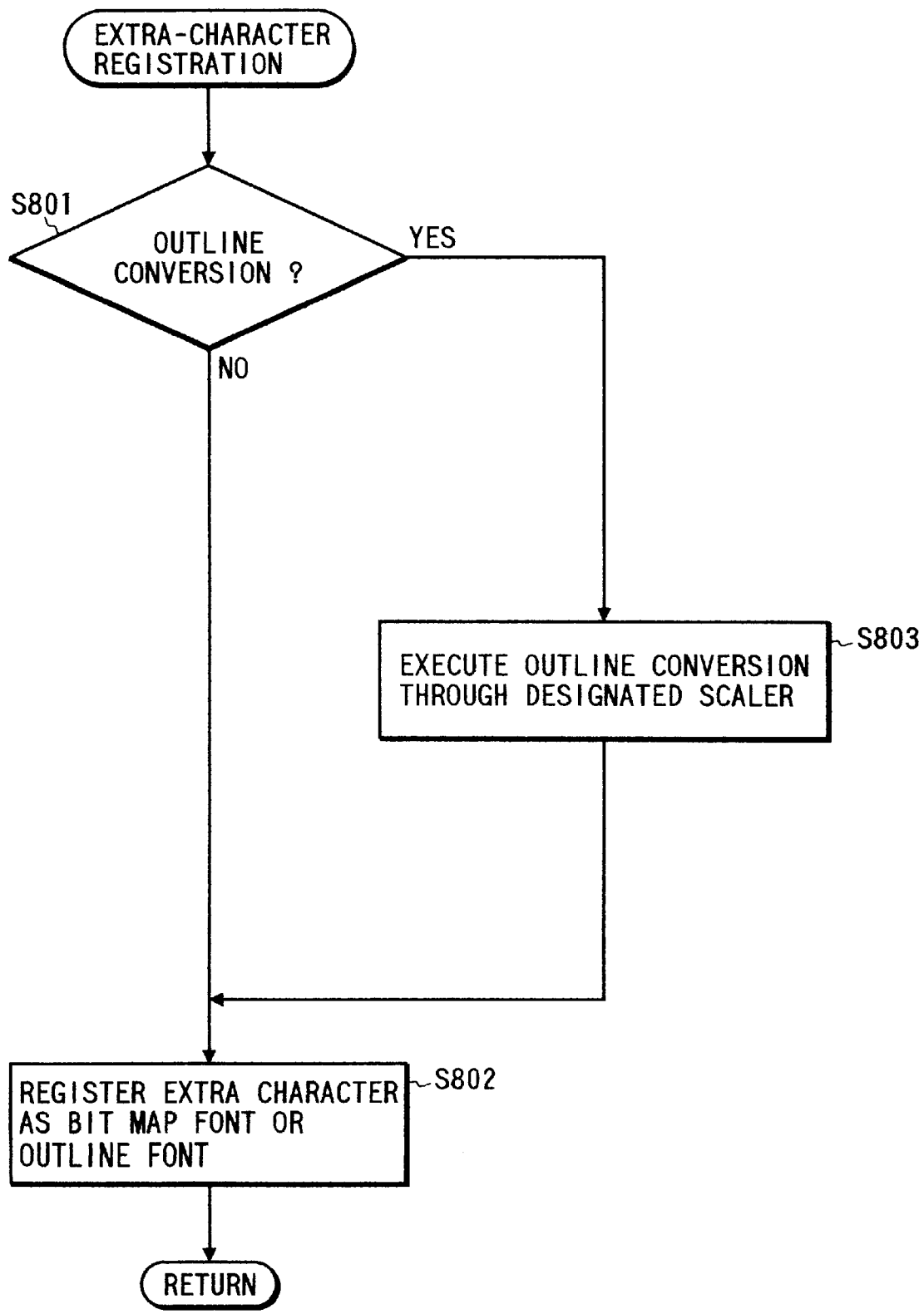
FIG. 13 is a flowchart showing a flow for an extra-character registering process according to the fifth embodiment.
Figure 14:
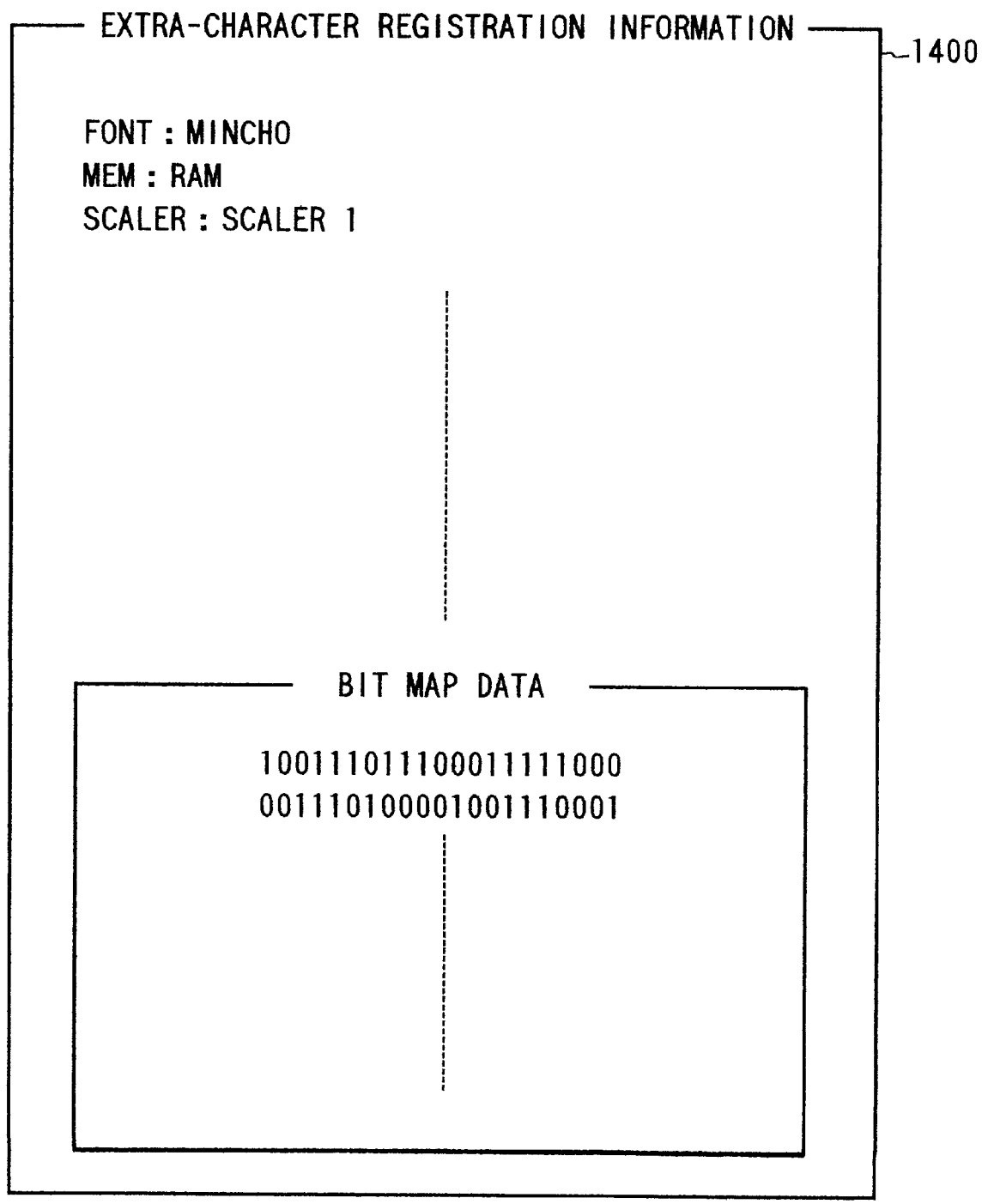
FIG. 14 is a diagram conceptually showing an example of extra-character registration information according to the fifth embodiment.

FIG. 13 is a flowchart showing a flow for the extra-character registering process according to the embodiment. This process is controlled by the controller 101 on the basis of the control programs stored in the ROM 101A. FIG. 14 is a diagram conceptually showing an example of extra-character registration information according to the embodiment. The extra-character registration information is actually described by a page description language or the like as a control code of the printer. The extra-character registration information includes information such as identifier of the memory, scaler which is used, and the like which are necessary for the extra-character registration in addition to character attributes such as a font name and the like.

In step S202 (FIG. 3), when it is judged that the read data is extra-character registration information 1400, step S801 follows and the extra-character registration information 1400 is referred to and a check is made to see if the outline conversion is performed (for example, in the extra-character registration information 1400, since the scaler 1 is designated as a scaler, it is judged that the outline conversion is performed). When it is judged that it is unnecessary to perform the outline conversion, the processing routine directly advances to step S802 and a registering process is executed as a bit map font. In case of performing the outline conversion, step S803 follows and the outline conversion is executed by using the scaler (scaler 1 in the example of FIG. 14) which is designated by the extra-character registration information. The outline font converted in step S802 is registered. It is assumed that there are a plurality of scalers and that the programs for the scalers as a substantial software have been stored in the ROM 101A.

It is sufficient to use a memory construction upon registration and processes when using the registered extra character, for example, which are similar to those in the fourth embodiment.

By performing the processes as mentioned above, since an arbitrary scaler can be designated on a unit basis such as character unit, group unit, or the like, the data scale can be reduced. Further, a processing speed of the bit map development as a whole can be improved and a character quality can be improved.

Sixth Embodiment

Although the scaler to convert into the outline font has been designated by the extra-character registration information 1400 in the fifth embodiment, according to the embodiment, the scaler is automatically selected in the printer 100.

Figure 15:
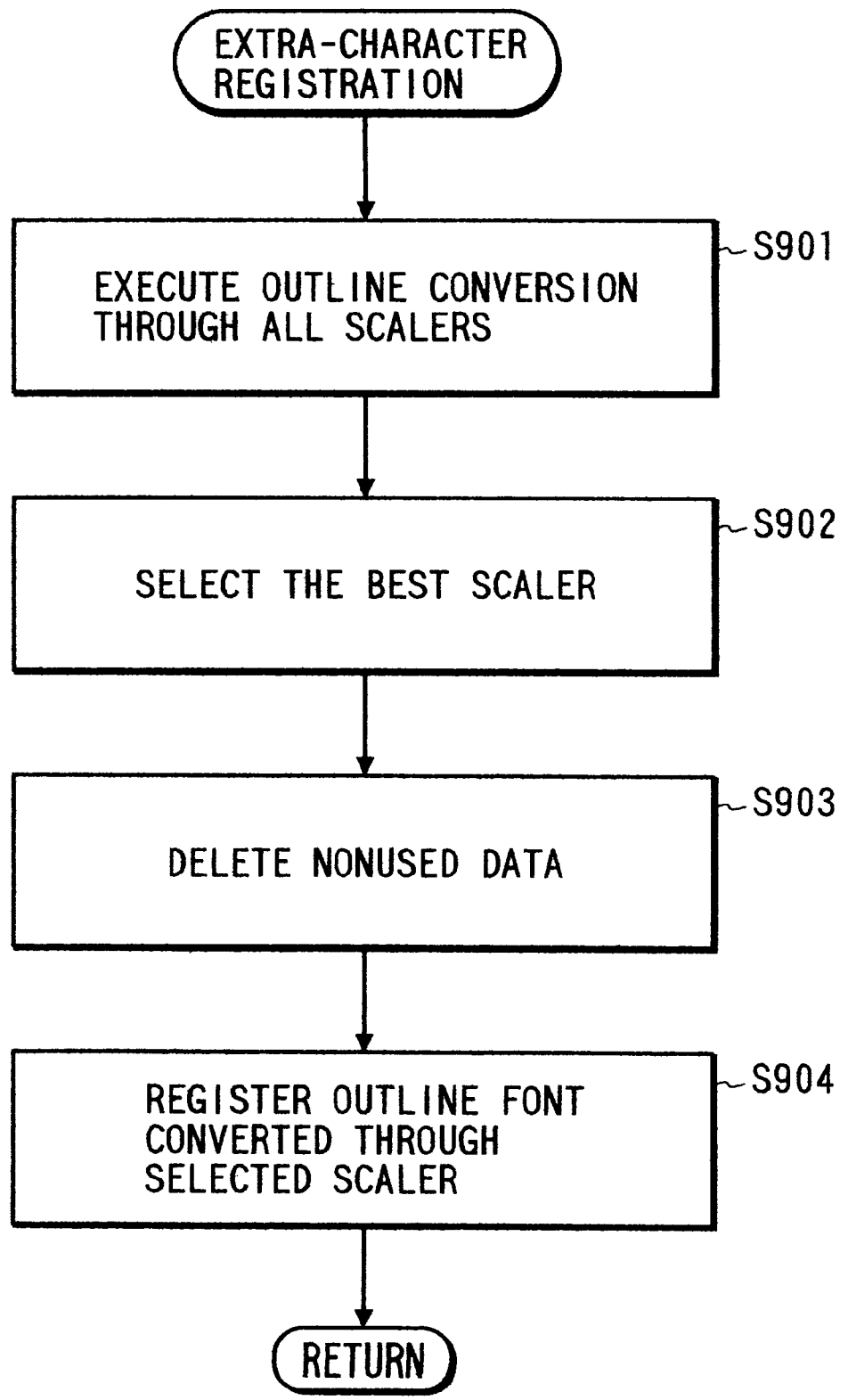
FIG. 15 is a flowchart showing a flow for an extra-character registering process according to the sixth embodiment.

According to the embodiment, the extra-character registering process (S208) in the fifth embodiment is changed as follows. FIG. 15 is a flowchart showing a flow for the extra-character registering process according to the embodiment. The process is controlled by the controller 101 on the basis of the control programs stored in the ROM 101A. In step S202 (FIG. 3), when the read data is the extra-character registration information as mentioned above, step S901 follows.

In step S901, all of the scalers (actually, for example, the processing programs of them have been stored in the ROM 101A) which the printer 100 has are applied and the read data is converted into the outline font. Information such as data scale after completion of the conversion into the outline font when each scaler is applied, processing time that is necessary for the development into a bit map, degree of deterioration of the character quality, and the like is held.

In step S902, the scaler that is most adapted to the preset selection conditions (for example, scaler in which the data scale after the conversion is minimum, scaler of the highest developing speed, scaler of the highest character quality, etc.) is selected on the basis of the above information. The selection conditions can be independently set in the printer or can be also instructed by the extra-character registration information. FIG. 16 is a diagram showing an example of the extra-character registration information according to the embodiment. In case of this example, the selection conditions of the scaler are designated so as to preferentially use the developing speed.

It is also possible to construct in a manner such that the developing speed is preferentially used (the character quality can be also preferentially used) as for a character whose use frequency is high and that the data capacity is preferentially used with respect to a character whose use frequency is relatively low. It is also possible to shift the preferential item step by step in a manner such that the developing speed is preferentially used (the character quality can be also preferentially used) in the case where a vacant capacity of the storage 107 is sufficiently large and that the data capacity is preferentially used in the case where the surplus vacant capacity is not so large.

In step S903, data other than the data of the outline font converted by the selected scaler is deleted from the work memory 101B (in the case where the data of the converted outline font has been saved in the storage 107, the relevant data in the storage 107 is deleted). In step S904, the outline font converted by the selected scaler is registered.

The processes in steps S901 to S903 can be also changed as follows. That is, first, the outline font conversion is performed by using one scaler and the result is held. By applying the next scaler, the processing time and the like are compared with the processing times and the like regarding the previous scaler and the processing time and the like regarding the scaler that is more preferably adapted to the selection conditions and only the outline font are held. By similarly applying the third and subsequent scalers, the outline font regarding the scaler that is most preferably adapted to the selection conditions can be obtained. In this case, it is sufficient to assure an area to hold the processing result regarding up to two scalers.

The processes when using the extra-character which was outline converted are similar to those in the fourth embodiment.

By executing the processes as mentioned above, since the scaler can be automatically selected on an arbitrary unit basis such as character unit, group unit, or the like, the data scale can be reduced. Further, the processing speed of the bit map development as a whole can be improved and the character quality can be improved.

Seventh Embodiment

According to the embodiment, in case of deleting a part of the programs of the plurality of scalers stored in the ROM 101A (in the case where a deleting command is received from the host computer 120 or the like), a situation such that the character data which was outline converted by using the program of the scaler to be deleted enters a use unable state is avoided.

Figure 17:
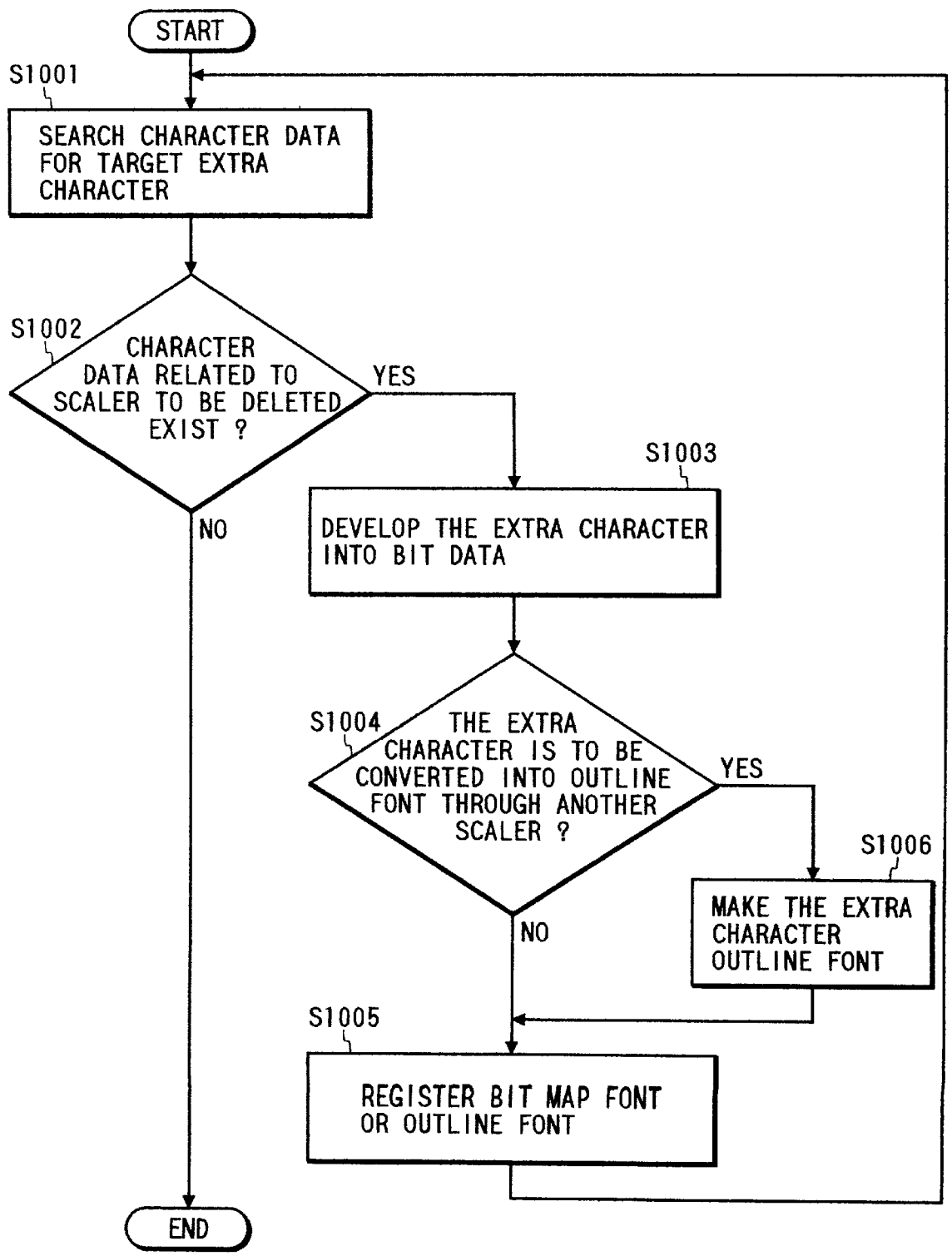
FIG. 17 is a flowchart showing a flow for the operation of the printer 100 according to the seventh embodiment.

FIG. 17 is a flowchart showing a flow for the operation of the printer 100 according to the embodiment. The process is controlled by the controller 101 on the basis of the control programs stored in the ROM 101A. The shift from the processes according to the flowchart of FIG. 3 to the processes according to the embodiment can be realized by generating an interruption in the controller 101 when a deleting command is received (or can be also realized by another method).

When deleting the program of the scaler from the ROM 101A, first in step S1001, the character data which was outline converted by using the program of the scaler as a target to be deleted is retrieved. When the relevant extra character is found or when the retrieval of all of the extra characters is finished, the processing routine advances to next step S1002. It is sufficient to perform the retrieval with reference to the scaler information 205 or 208.

In step S1002, a check is made to see if there is character data regarding the program of the scaler to be deleted as a result of the retrieval. When the relevant data doesn't exist, the processing routine is finished. When such data exists, step S1003 follows and the corresponding extra character is once developed into the bit map. In step S1004, a check is made to see if the outline conversion is again performed by using another scaler (scaler which is not deleted). on the basis of the judgment result, the character data which was outline converted in step S1006 or the character (bit map font) which was bit map developed is registered in step S1005.

The scaler which is used in the outline reconversion can be arbitrarily designated or can be also automatically selected by a method similar to the sixth embodiment.

By deleting the scaler from the printer 100 (ROM 101A) by performing the processes as mentioned above, it is possible to prevent that the extra character using such a scaler enters a use unable state in association with the deletion.

In the above embodiment, the printer (the first to third embodiments) characterized in that the compression method is selected and the printer (the fourth to seventh embodiments) characterized in that the scaler is selected have separately been described for convenience of explanation. However, it will be obviously understood that a further efficient printing process can be realized by using both of the above features. In this case, it is an efficient manner to first convert the inputted character data into the outline font in accordance with the latter embodiments and subsequently to compress and register in accordance with the former embodiments.

Although the above embodiments have been described with respect to the processes when the character data of the bit map format into the data of the outline font format, the invention is not limited to such a method. For example, it will be obviously understood that the invention can be also widely applied to the case of converting the character data of the bit map format into the data of the vector format such as a stroke font or the like.

Although the above embodiments have been described with respect to the printer for printing the print data by the printer engine 106, the invention is not limited to such a printer. For example, it will be obviously understood that the invention can be also widely applied to the case where the printer engine 106 in the above embodiments is replaced to a display device such as a CRT or the like.

The invention can be also applied to a system constructed by a plurality of apparatuses or to an apparatus comprising one equipment. The invention can be also obviously applied to a case where the invention is embodied by supplying a program to a system or an apparatus. In this case, a memory medium in which the programs regarding the invention have been stored constructs the invention. By reading out the programs from the memory medium to a system or an apparatus, the system or apparatus functions in a specified form.

According to the invention as described above, the character outputting process can be efficiently executed.

What is claimed is:

1. A character processing apparatus comprising:
    storage means for storing a plurality of kinds of vector font data and a plurality of kinds of scalers for developing said vector font data into character patterns;
    input means for inputting character information corresponding to a character to be outputted;
    selecting means for selecting the scaler on the basis of the character information inputted by said input means; and
    developing means for developing the character pattern of the character information inputted by said input means by using the scaler selected by said selecting means.

2. An apparatus according to claim 1, further including output means for outputting the character pattern developed by said developing means.

3. An apparatus according to claim 2, wherein said output means is a printer.

4. An apparatus according to claim 2, wherein said output means is a display.

5. An apparatus according to claim 1, wherein the plurality of kinds of scalers are a first scaler for developing the vector font data of a stroke format and a second scaler for developing the vector font data of a whole outline format.

6. An apparatus according to claim 5, wherein the first scaler is used for the vector font data of a Kanji (Chinese character) portion and the second scaler is used for the vector font data of a non-Kanji portion.

7. An apparatus according to claim 1, wherein the plurality of kinds of scalers are a third scaler for developing the vector font data designed by a first coordinate system and a fourth scaler for developing the vector font data designed by a second coordinate system larger than said first coordinate system.

8. An apparatus according to claim 7, wherein the fourth scaler is used for the vector font data of a font in which importance is paid to a design and the third scaler is used for the vector font data of fonts other than said font.

9. A character processing method operative in an apparatus including storage means for storing a plurality of kinds of vector font data and a plurality of kinds of scalers for developing said vector font data into character patterns, said method comprising:
    an input step of inputting character information corresponding to a character to be outputted;
    a selecting step of selecting the scaler on the basis of the character information inputted in said input step; and
    a developing step of developing the character pattern of the character information inputted in said input step by using the scaler selected in said selecting step.

10. A method according to claim 9, further including an output step of outputting the character pattern developed in said developing step by output means.

11. A method according to claim 10, wherein the output means is a printer.

12. A method according to claim 10, wherein the output means is a display.

13. A method according to claim 9, wherein the plurality of kinds of scalers are a first scaler for developing the vector font data of a stroke format and a second scaler for developing the vector font data of a whole outline format.

14. A method according to claim 13, wherein the first scaler is used for the vector font data of a Kanji (Chinese character) portion and the second scaler is used for the vector font data of a non-Kanji portion.

15. A method according to claim 9, wherein the plurality of kinds of scalers are a third scaler for developing the vector font data designed by a first coordinate system and a fourth scaler for developing the vector font data designed by a second coordinate system larger than said first coordinate system.

16. A method according to claim 15, wherein the fourth scaler is used for the vector font data of a font in which importance is paid to a design and the third scaler is used for the vector font data of fonts other than said font.

17. A memory which is accessed by a microprocessor using storage means for storing a plurality of kinds of vector font data and a plurality of kinds of scalers for developing said vector font data into character patterns, wherein said memory stores:
    an input program for inputting character information corresponding to a character to be outputted;
    a selecting program for selecting the scaler on the basis of the character information inputted by said input program; and
    a developing program for developing the character pattern of the character information inputted by said input program by using the scaler selected by said selecting program.

18. A data processing apparatus comprising:
    a plurality of pairs of compression means and respective decompression means, wherein in each pair said compression means compresses data to provide compressed data and said decompression means decompresses the respective compressed data;
    retaining means for controlling each pair of compression means and decompression means to compress received data and decompress the compressed data, and for retaining a compression-decompression time and a compression rate for each pair; and
    selection means for selecting one of said plurality of pairs of compression means and decompression means based on information retained in said retaining means such that said selected pair of compression means and decompression means has a shorter compression-decompression time than the others when a first mode is set and has a longer compression-decompression time than the others when a second mode is set.

19. A data processing apparatus comprising:
    a plurality of pairs of compression means and decompression means, wherein in each pair said compression means compresses data to provide compressed data and said decompression means decompresses the respective compressed data; and
    control means for, when first data exists which was compressed by a compression means for one of said pairs to be deleted in response to a deletion instruction, controlling said decompression means in said one pair to decompress the first data to second data, said control means further selectively either (a) controlling registration of the second data or (b) controlling a compression means in another of said pairs to compress the second data to third data and then controlling registration of the third data.

20. A data processing method using a plurality of pairs of compression means and decompression means, wherein in each pair said compression means compresses data to provide compressed data and said decompression means decompresses the respective compressed data, said method comprising the steps of:

controlling each pair of compression means and decompression means to compress received data and decompress the compressed data, retaining a compression-decompression time and a compression rate for each pair of compression means and decompression means; and selecting one of the plurality of pairs of compression means and decompression means based on information retained in said retaining step such that the selected pair of compression means and decompression means has a shorter compression-decompression time than the others when a first mode is set and has a longer compression-decompression time than the others when a second mode is set.

21. A data processing method comprising steps using a plurality of pairs of compression means and decompression means, wherein in each pair the compression means compresses data to provide compressed data an d the decompression means decompresses the respective compressed data, said method further comprising the step of:

when first data exists which was compressed by a compression means for one of the pairs to be deleted in response to a deletion instruction, controlling the decompression means in the one pair to decompress the first data to second data, said control step further selectively either (a) controlling registration of the second data or (b) controlling a compression means in another of the pairs to compress the second data to third data and then controlling registration of the third data.

22. A memory which is accessed by a microprocessor, wherein said memory stores:

a program for controlling a plurality of pairs of compression means and respective decompression means so that, in each pair, the compression means compresses data to provide compressed data and the decompression means decompresses the respective compressed data;

a program for controlling each pair of compression means and decompression means to compress received data and decompress the compressed data, and for retaining a compression-decompression time and a compression rate for each pair; and a program for selecting one of the plurality of pairs of compression means and decompression means based on information retained by said retaining program such that the selected pair of compression means and decompression means has a shorter compression-decompression time than the others when a first mode is set and has a longer compression-decompression time than the others when a second mode is set.

23. A memory which is accessed by a microcomputer, wherein said memory stores:

a program for performing steps using a plurality of pairs of compression means and decompression means, wherein in each pair the compression means compresses data to provide compressed data and the decompression means decompresses the respective compressed data; and a program for, when first data exists which was compressed by a compression means for one of the pairs to be deleted in response to a deletion instruction, controlling the decompression means in the one pair to decompress the first data to second data, said control program further selectively either (a) controlling registration of the second data or (b) controlling a compression means in another of the pairs to compress the second data to third data and then controlling registration of the third data.

* * * * *

UNITED STATES PATENT AND TRADEMARK OFFICE
CERTIFICATE OF CORRECTION

PATENT NO. : 6,016,155

DATED : January 18, 2000

INVENTOR(S) : KOOU HIRAIKE

It is certified that error appears in the above-identified patent and that said Letters Patent is hereby corrected as shown below:

ON THE TITLE PAGE:

[56] References Cited, under *Attorney, Agent, or Firm*:

"Fitzpatrick Cella Harper & Scinto" should read --Fitzpatrick, Cella, Harper & Scinto--.

COLUMN 2:

Line 9, "is-used" should read --is used--.

COLUMN 7:

Line 12, "so an" should be deleted.

UNITED STATES PATENT AND TRADEMARK OFFICE
CERTIFICATE OF CORRECTION

PATENT NO. : 6,016,155
DATED : January 18, 2000
INVENTOR(S) : KOOU HIRAIKE

It is certified that error appears in the above-identified patent and that said Letters Patent is hereby corrected as shown below:

COLUMN 15:

Line 29, "an d" should read --and--.

Signed and Sealed this

Tenth Day of April, 2001

Attest:

NICHOLAS P. GODICI

Attesting Officer  Acting Director of the United States Patent and Trademark Office